(12) United States Patent
Wiktor

(10) Patent No.: US 11,306,445 B2
(45) Date of Patent: Apr. 19, 2022

(54) HYDRAULIC SYSTEM FOR A WORKING MACHINE

(71) Applicant: Volvo Construction Equipment AB, Eskilstuna (SE)

(72) Inventor: Roland Wiktor, Hameln (DE)

(73) Assignee: Volvo Construction Equipment AB, Eskilstuna (SE)

(*) Notice: Subject to any disclaimer, the term of this patent is extended or adjusted under 35 U.S.C. 154(b) by 112 days.

(21) Appl. No.: 16/619,608

(22) PCT Filed: Jun. 7, 2017

(86) PCT No.: PCT/EP2017/063773
§ 371 (c)(1),
(2) Date: Dec. 5, 2019

(87) PCT Pub. No.: WO2018/224135
PCT Pub. Date: Dec. 13, 2018

(65) Prior Publication Data
US 2020/0157749 A1    May 21, 2020

(51) Int. Cl.
*E01C 19/28*     (2006.01)
*E01C 21/00*     (2006.01)
(Continued)

(52) U.S. Cl.
CPC ............ *E01C 19/286* (2013.01); *E01C 21/00* (2013.01); *F15B 1/02* (2013.01); *F15B 11/161* (2013.01);
(Continued)

(58) Field of Classification Search
CPC ............... F15B 1/02; F15B 2211/6336; F15B 2211/20569; E01C 19/286; E01C 21/00; E01C 19/28; E02F 9/2289
See application file for complete search history.

(56) References Cited

U.S. PATENT DOCUMENTS

| 5,873,427 A * | 2/1999 | Ferguson ................ B60T 7/042 180/178 |
| 6,339,929 B1 * | 1/2002 | Udagawa ............... F15B 21/087 60/468 |

(Continued)

FOREIGN PATENT DOCUMENTS

| CN | 101111684 A | 1/2008 |
| CN | 104831775 A | 8/2015 |

(Continued)

OTHER PUBLICATIONS

International Search Report and Written Opinion of the International Searching Authority, PCT/EP2017/063773, dated Feb. 8, 2018, 13 pages.

(Continued)

*Primary Examiner* — Thomas E Lazo
(74) *Attorney, Agent, or Firm* — Sage Patent Group

(57) ABSTRACT

A hydraulic system for a working machine includes a feeding pump; and a plurality of variable displacement hydraulic machines being connected in parallel to the feeding pump; At least one of the variable displacement hydraulic machines is adapted to drive a ground engagement element of the working machine, and at least one of the variable displacement hydraulic machines is adapted to drive a vibrator for vibrating a ground engagement element of the working machine.

14 Claims, 4 Drawing Sheets

(51) Int. Cl.
  F15B 1/02 (2006.01)
  F15B 11/16 (2006.01)
  F15B 11/20 (2006.01)
  F15B 18/00 (2006.01)
  F16H 61/425 (2010.01)
  F16H 61/435 (2010.01)

(52) U.S. Cl.
  CPC .............. F15B 11/20 (2013.01); F15B 18/00 (2013.01); F16H 61/425 (2013.01); F16H 61/435 (2013.01); *F15B 2201/00* (2013.01)

(56) References Cited

U.S. PATENT DOCUMENTS

| | | | | |
|---|---|---|---|---|
| 8,108,111 B2* | 1/2012 | Stein | ........................ | F15B 1/024 |
| | | | | 701/51 |
| 9,096,115 B2* | 8/2015 | Ho | ........................ | F15B 1/024 |
| 9,207,157 B2* | 12/2015 | Frelich | ................. | E01C 19/286 |
| 9,416,799 B2* | 8/2016 | Danzl | ..................... | F15B 21/14 |
| 9,499,947 B2* | 11/2016 | Rohr | ..................... | E01C 19/286 |
| 2013/0125536 A1 | 5/2013 | Ho et al. | | |
| 2013/0133318 A1* | 5/2013 | Vogl | ........................ | F15B 7/006 |
| | | | | 60/327 |
| 2014/0260232 A1 | 9/2014 | Danzl et al. | | |
| 2016/0377097 A1* | 12/2016 | Cosoli | ..................... | F15B 11/17 |
| | | | | 60/327 |

FOREIGN PATENT DOCUMENTS

WO  WO 2008/069706 A1  6/2008
WO  WO 2010/006759 A1  1/2010

OTHER PUBLICATIONS

Chinese First Office Action dated Jun. 22, 2021 for Chinese Patent Application No. 201780090507.2, 23 pages (including English translation).

* cited by examiner

HYDRAULIC SYSTEM FOR A WORKING MACHINE

CROSS REFERENCE TO RELATED APPLICATION

This application is a 35 U.S.C. § 371 national stage application of PCT International Application No. PCT/EP/2017/063773 filed on Jun. 7, 2017, the disclosure and content of which is incorporated by reference herein in its entirety.

TECHNICAL FIELD

The invention relates to a hydraulic system for a working machine. Moreover, the present invention relates to a powertrain as well as a working machine. Further, the present invention relates to a method for operating a working machine, and a control unit for operating a working machine.

The invention can be applied in heavy-duty vehicles, such as trucks, buses and construction equipment. Although the invention will be described with respect to a soil compactor, the invention is not restricted to this particular vehicle, but may also be used in other vehicles such as an asphalt roller or a road roller.

BACKGROUND

A working machine that is used for compacting the ground on which the working machine travels may be referred to as a compaction machine. Generally, a compaction machine comprises one or more ground engagement elements, adapted to propel the compaction machine, as well as a vibrator for vibrating at least one of the ground engagement elements. An example of such a compaction machine is presented in WO 2010/006759 A1.

In a compaction machine, energy may be transmitted from a power source to the ground engagement elements via a hydrostatic drive line since a hydrostatic driveline implies a versatile power distribution to the ground engagement elements. However, a hydrostatic drive line for compaction machines may generally be associated with relatively large energy losses, for instance when the one of more of the ground engagement elements slip against the ground.

SUMMARY

An object of the invention is to provide a hydraulic system for a working machine which can distribute energy from a power source to a plurality of hydraulic machines that can be used for a compaction operation of the working machine, which hydraulic system implies appropriately low power losses.

According to a first aspect of the invention, the object is achieved by a device according to claim 1.

As such, the first aspect of the present invention relates to a hydraulic system for a working machine. The hydraulic system comprises:
a feeding pump;
a plurality of variable displacement hydraulic machines being connected in parallel to the feeding pump;
at least one, preferably a plurality, of the variable displacement hydraulic machines being adapted to drive a ground engagement element of the working machine.

According to the first aspect of the present invention, at least one of the variable displacement hydraulic machines is adapted to drive a vibrator for vibrating a ground engagement element of the working machine.

As such, the first aspect of the present invention proposes a "power grid" to which the feeding pump can feed fluid at a certain flow rate and at a certain pressure. Each one of the variable displacement hydraulic machines connected in parallel to the feeding pump can thereafter consume a required portion of the hydraulic power produced by the feeding pump. This in turn implies an appropriate control of the feeding pump since the feeding pump can be controlled so as to provide hydraulic power required for the variable displacement hydraulic machines but not necessarily providing hydraulic power in excess thereof.

Optionally, the plurality of variable displacement hydraulic machines is connected to the feeding pump in parallel through a circuit conduit assembly, preferably through a closed circuit conduit assembly. The circuit conduit assembly, and in particular the closed circuit conduit assembly, implies an appropriate energy usage. For instance, the circuit conduit assembly, and in particular the closed circuit conduit assembly, implies that energy may be recuperated in a straightforward manner. As an example, with a closed circuit conduit assembly, hydraulic power produced by one or more variable displacement hydraulic machines may be consumed by one or more of the other variable displacement hydraulic machines.

Optionally, the closed circuit conduit assembly comprises an accumulator. The accumulator further increases the possibility to recuperate hydraulic energy. For instance, when a variable displacement hydraulic machine adapted to drive a vibrator is switched off, e.g. by changing the displacement of the associated variable displacement hydraulic machine, hydraulic energy produced by that hydraulic machine may be stored in the accumulator and thereafter be reused when the vibrator is started again.

Optionally, at least one, preferably each one, of the variable displacement hydraulic machines that is adapted to drive a ground engagement element of the working machine is adapted to operate both as a hydraulic pump and as a hydraulic motor. As such, when the speed of the working machine is reduced, e.g. when the working machine is braked, one or more of the variable displacement hydraulic machines adapted to drive ground engagement elements may be set so as to have a negative displacement such that each one of the associated variable displacement hydraulic machines acts as a pump feeding hydraulic energy to other portions of the hydraulic system, such as the accumulator mentioned hereinabove. The energy fed to the hydraulic system, e.g. stored in the accumulator, may thereafter be used when it is desired to move the working machine again.

Optionally, the hydraulic system comprises a set of speed sensors, each speed sensor being adapted to determine a value indicative of a rotational speed of one of the variable displacement hydraulic machines that is adapted to drive a ground engagement element of the working machine. The speed sensors may be used for a plurality of purposes. As one non-limiting example, the speed sensors may be used for determining the speed of the working machine. As another non-limiting example, the speed sensors may be used for detecting a slip of one or more of the ground engaging elements. This in turn implies an appropriate motion control of the ground engaging elements.

Optionally, the hydraulic system comprises a set of displacement control devices, each displacement control device being adapted to control the displacement of one of the variable displacement hydraulic machines. This in turn implies that each variable displacement hydraulic machine can be controlled individually, thereby enabling increased possibilities to control the working machine.

Optionally, the hydraulic system comprises a master control unit adapted to issue a signal to each displacement control device in the set of displacement control devices.

Optionally, at least one ground engagement element is a compactor drum.

Optionally, the feeding pump has a variable displacement. The variable displacement of the feeding pump implies that fluid can be fed to the variable displacement hydraulic machines at a desired pressure. As a non-limiting example, with respect to e.g. efficiency, noise and/or durability, it may be beneficial to keep the pressure fed by the feeding pump at a low level whilst still meeting the hydraulic power requirements of the variable displacement hydraulic machines.

A second aspect of the present invention relates to a powertrain comprising a power source and a hydraulic system according to any one of the preceding claims. The power source is operably connected to the feeding pump of the hydraulic system.

A third aspect of the present invention relates to a working machine, preferably a road compactor, comprising a powertrain according to the second aspect of the present invention and/or a hydraulic system according to the first aspect of the present invention.

Optionally, the working machine comprises a set of ground engagement elements, the set of ground engagement elements comprising at least one of a wheel and a compactor drum.

A fourth aspect of the present invention relates to a method for operating a working machine, preferably a road compactor, comprising a powertrain which in turn comprises a power source and a hydraulic system. The hydraulic system comprises:

a feeding pump operably connected to the power source;
a plurality of variable displacement hydraulic machines being connected in parallel to the feeding pump;
at least one, preferably a plurality, of the variable displacement hydraulic machines being adapted to drive a ground engagement element of the working machine, and
at least one of the variable displacement hydraulic machines being adapted to drive a vibrator for vibrating a ground engagement element of the working machine.

The method according to the fourth aspect of the present invention further comprises:
determining a desired driving condition of the working machine, and
operating at least the power source and each one of the variable displacement hydraulic machines being adapted to drive a ground engagement element in order to obtain the desired driving condition.

Optionally, the plurality of variable displacement hydraulic machines is connected to the feeding pump in parallel through a circuit conduit assembly, preferably through a closed circuit conduit assembly, and wherein the closed circuit conduit assembly comprises an accumulator. The method further comprises:
upon determination that the desired driving condition of the working machine is braking the working machine, controlling at least one of the variable displacement hydraulic machines that is adapted to drive a ground engagement element of the working machine so as to operate as a hydraulic pump for feeding fluid to the accumulator.

A fifth aspect of the present invention relates to a control unit for operating a working machine, preferably a road compactor, comprising a powertrain which in turn comprises a power source and a hydraulic system. The hydraulic system comprises:

a feeding pump operably connected to the power source;
a plurality of variable displacement hydraulic machines being connected in parallel to the feeding pump;
at least one, preferably a plurality, of the variable displacement hydraulic machines being adapted to drive a ground engagement element of the working machine, and
at least one of the variable displacement hydraulic machines being adapted to drive a vibrator for vibrating a ground engagement element of the working machine.

The control unit is adapted to:
receive information indicative of a desired driving condition of the working machine, and
issue a signal to at least the power source and to each one of the variable displacement hydraulic machines being adapted to drive a ground engagement element so that they are operated in order to obtain the desired driving condition.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
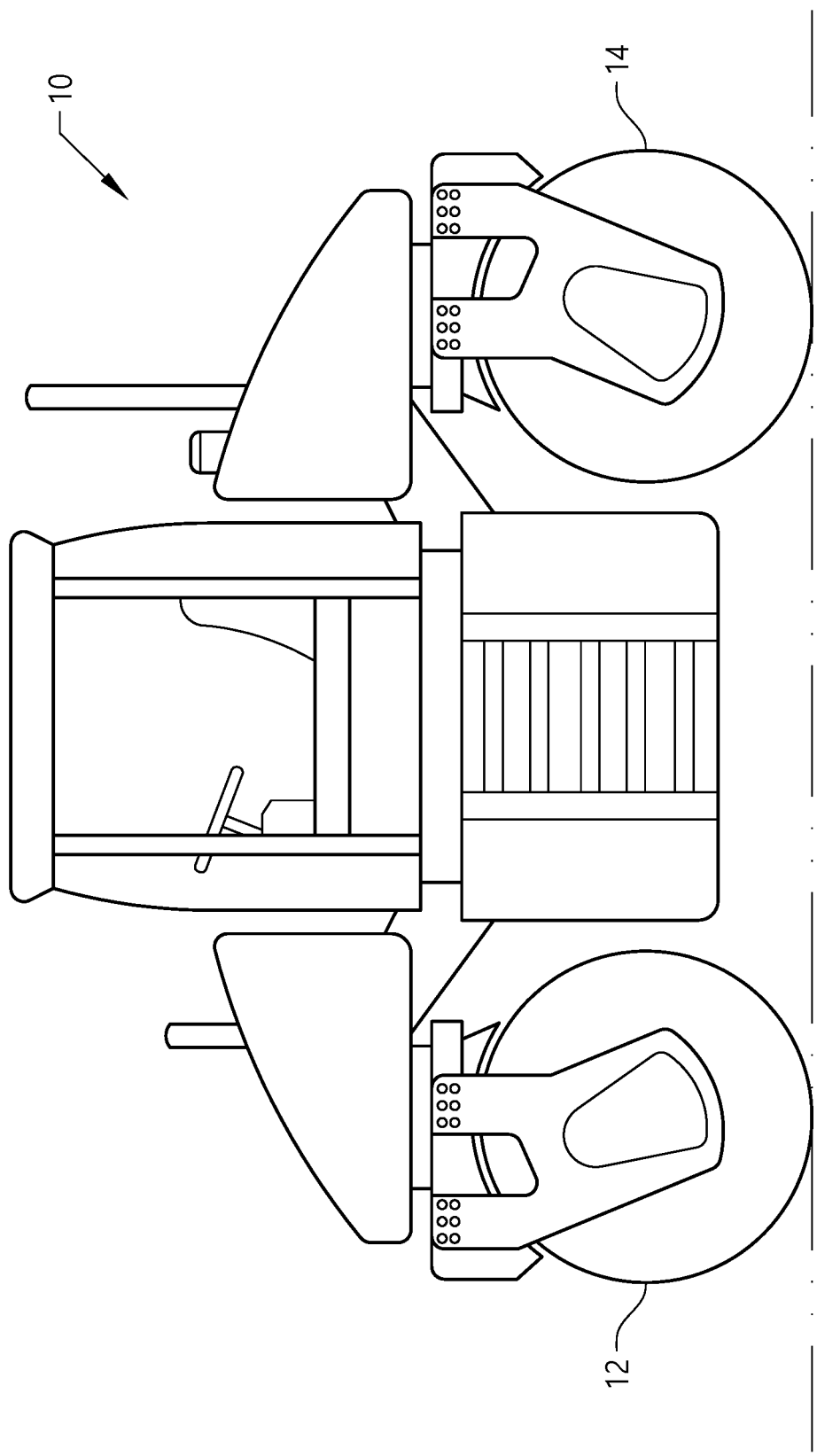
FIG. 1 is schematic side view of an embodiment of a working machine.

FIG. 1 illustrates the schematic configuration of a working machine 10, exemplified as a soil compactor. Moreover, as illustrated in FIG. 1, the working machine 10 comprises ground engagement elements 12, 14. In the FIG. 1 embodiment, the ground engagement elements 12, 14 are exemplified as a front compactor drum 12 and a rear compactor drum 14. However, it is also envisaged that other embodiments of the working machine may, instead of or in addition to the FIG. 1 compactor drums, comprise other types of ground engagement elements. As non-limiting examples, it is envisaged that embodiments of the working machine 10 may, as ground engaging elements, comprise one or more wheels (not show) and/or one or more crawlers (not shown). A working machine, such as the FIG. 1 working machine, preferably comprises a powertrain.

Figure 2:
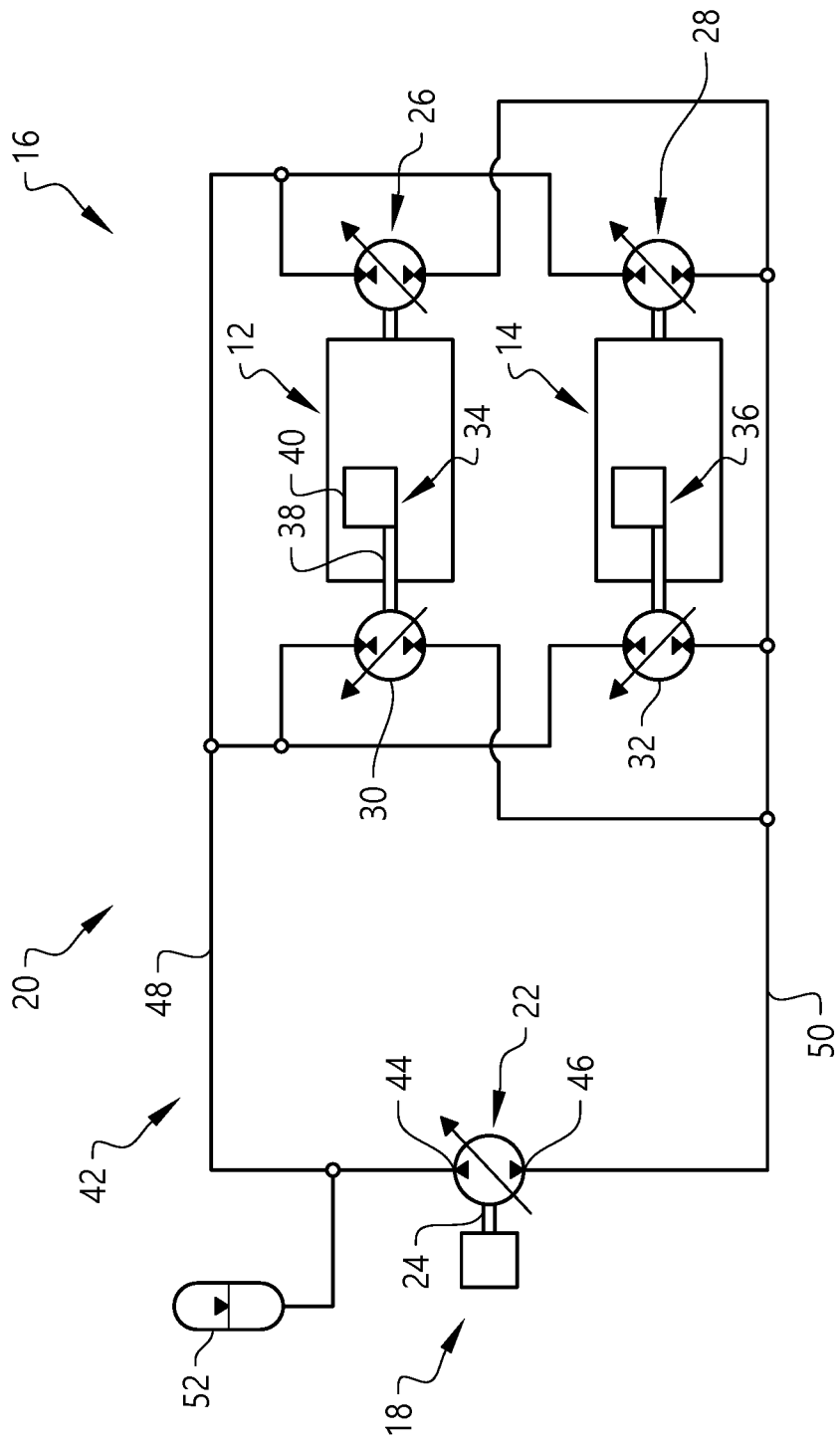
FIG. 2 illustrates an embodiment of a powertrain and a hydraulic system.

FIG. 2 illustrates an embodiment of a powertrain 16. Purely by way of example, the FIG. 2 powertrain 16 may be used for propelling the FIG. 1 working machine 10. As may be gleaned from FIG. 2, the embodiment disclosed therein comprises a power source 18 and a hydraulic system 20. As a non-limiting example, the power source 18 may comprise, or be constituted by, an internal combustion engine such as a diesel engine. However, it is also envisaged that the power source 18 may comprise, or be constituted by, other types of power generating means such as an electric motor (not shown). Moreover, as indicated in FIG. 2, the power source 18 is operably connected to a feeding pump 22 of the hydraulic system 20. Purely by way of example, and as exemplified in the FIG. 2 embodiment, the power source 18 may be mechanically connected to the feeding pump 22, for instance via a shaft 24.

The hydraulic system 20 comprises the feeding pump 22. A plurality of variable displacement hydraulic machines 26, 28, 30, 32 is connected in parallel to the feeding pump 22.

At least one, preferably a plurality, of the variable displacement hydraulic machines is adapted to drive a ground engagement element of the working machine. In the FIG. 2 embodiment, the hydraulic system 20 comprises two variable displacement hydraulic machines 26, 28, each one of which being adapted to drive a respective ground engagement element 12, 14 of the working machine. In particular, in the FIG. 2 embodiment, a first variable displacement hydraulic machine 26 is adapted to drive a first ground engagement element 12, such as the front compactor drum 12 of the FIG. 1 working machine. Moreover, as exemplified in FIG. 2, a second variable displacement hydraulic machine 28 may be adapted to drive a second ground engagement element 14, such as the rear compactor drum 14 of the FIG. 1 working machine. However, it is also envisaged that embodiments of the hydraulic system 20 may comprise only one variable displacement hydraulic machine adapted to drive a ground engagement element. As another non-limiting example, embodiments of the hydraulic system 20 may comprise only three or more variable displacement hydraulic machines, each one of which being adapted to drive a ground engagement element, such as a respective ground engagement element.

Moreover, as indicated in FIG. 2, at least one of the variable displacement hydraulic machines 30, 32 is adapted to drive a vibrator for vibrating a ground engagement element of the working machine. In particular, in the FIG. 2 embodiment, a third variable displacement hydraulic machine 30 is adapted to drive a first vibrator 34, such as a vibrator for the front compactor drum 12 of the FIG. 1 working machine. Moreover, as also exemplified in FIG. 2, a fourth variable displacement hydraulic machine 32 may be adapted to drive a second vibrator 36, such as a vibrator for the rear compactor drum 14 of the FIG. 1 working machine.

As a non-limiting example, and as is illustrated in FIG. 2 with reference to the first vibrator 34, a vibrator may comprise a vibrator shaft 38 comprising a vibrator eccentricity 40. As such, when the vibrator shaft 38 rotates, a vibration is produced by means of the vibrator eccentricity 40. However, it is also envisaged that implementations of the vibrator may produce a vibrations using other means (not shown).

Moreover, as exemplified in FIG. 2, the plurality of variable displacement hydraulic machines 26, 28, 30, 32 may be connected to the feeding pump 24 in parallel through a circuit conduit assembly 42. Preferably, the plurality of variable displacement hydraulic machines 26, 28, 30, 32 may be connected to the feeding pump 24 in parallel through a closed circuit conduit assembly 42 as indicated in FIG. 2.

Purely by way of example, the feeding pump 24 may comprise a high pressure side 44 and a low pressure side 46. Moreover, the circuit conduit assembly 42 may comprise a high pressure line 48 fluidly connecting the high pressure side 44 of the feeding pump 22 to each one of the plurality of variable displacement hydraulic machines 26, 28, 30, 32.

Further, the circuit conduit assembly 42 may comprise a low pressure line 50 fluidly connecting the each one of the plurality of variable displacement hydraulic machines 26, 28, 30, 32 to the low pressure side 46 of the feeding pump 22.

Purely by way of example, and as indicated in the FIG. 2 embodiment, the closed circuit conduit assembly may comprise an accumulator 52. The accumulator 52 may be used for recuperating hydraulic energy, as will be elaborated hereinbelow. As a non-limiting example, and as indicated in the FIG. 2 embodiment, the accumulator 52 may be fluidly connected to the high pressure line 48 of the circuit conduit assembly 42.

Moreover, at least one, preferably each one, of the variable displacement hydraulic machines that is adapted to drive a ground engagement element of the working machine may be adapted to operate both as a hydraulic pump and as a hydraulic motor. In the embodiment illustrated in FIG. 2, each one of the first and second variable displacement hydraulic machines 26, 28 is adapted to operate both as a hydraulic pump and as a hydraulic motor.

As such, when it for instance is desired to brake the working machine hosting the FIG. 2 power train, each one of the first and second variable displacement hydraulic machines 26, 28 may be actuated so as to operate as a hydraulic pump thus pumping fluid from the low pressure line 50 to the high pressure line 48 of the circuit conduit assembly 42. The fluid thus pumped may be used for charging the accumulator 52 such that energy is stored by the accumulator 52.

The energy stored in the accumulator 52 may thereafter be used, e.g. for feeding fluid to one or more of the variable displacement hydraulic machines 26, 28 for propelling the working machine and/or for feeding fluid one or more variable displacement hydraulic machines 30, 32 connected to a vibrator 34, 36.

Figure 3:
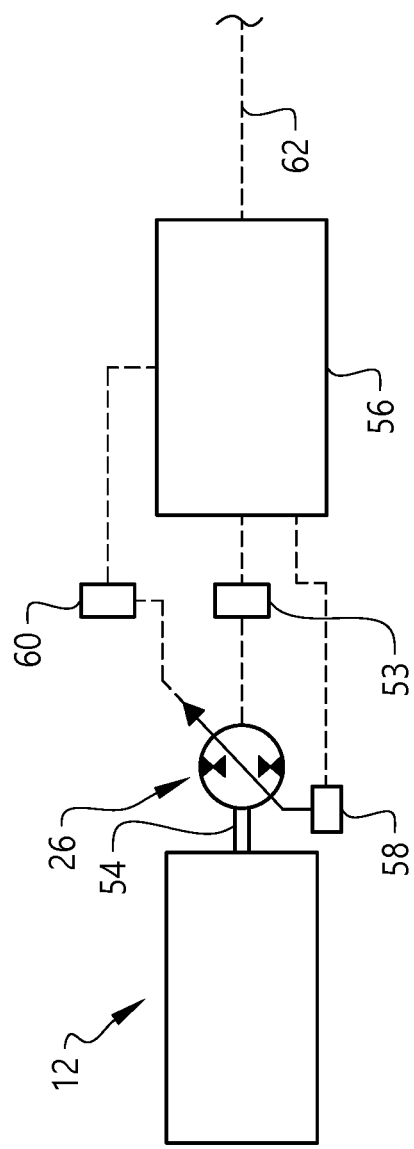
FIG. 3 illustrates a portion of an embodiment of a hydraulic system.

Moreover, the hydraulic system 20 may comprise a set of speed sensors. Each speed sensor is adapted to determine a value indicative of a rotational speed of one of the variable displacement hydraulic machines that is adapted to drive a ground engagement element of the working machine. FIG. 3 illustrates a portion of a hydraulic system 20 and the FIG. 3 further illustrates an example of a speed sensor 53. The FIG. 3 speed sensor 53 is adapted to determine the rotational speed of a variable displacement hydraulic machine 26 adapted to drive a ground engagement element 12. Purely by way of example, the FIG. 3 variable displacement hydraulic machine 26 and ground engagement element 12 may be the components with the same reference numerals discussed hereinabove in relation to FIG. 2.

In the FIG. 3 implementation, the speed sensor 53 is adapted to determine the rotational speed of a shaft 54 rotationally connected to the variable displacement hydraulic machine 26. However, other implementations are also envisaged, e.g. implementations in which the speed sensor 53 is adapted to determine the rotational speed of a component that does not rotate at the same rotational speed as a shaft of the variable displacement hydraulic machine 26 but wherein the a ratio between the rotational speed of the component and the rotational speed of the variable displacement hydraulic machine 26 is known or at least can be determined. As a non-limiting example, a speed sensor 53 may be adapted to determine the rotational speed of the ground engagement element 12.

As a non-limiting example, and as illustrated in FIG. 3, the value indicative of the rotational speed of the variable displacement hydraulic machine 26 may be transmitted to a variable displacement hydraulic machine control unit 56.

Furthermore, the hydraulic system may comprise a set of displacement control devices. Each displacement control device is adapted to control the displacement of one of the variable displacement hydraulic machines.

The above is exemplified in FIG. 3 illustrating a displacement control device 58 adapted to control the displacement of the variable displacement hydraulic machine 26. Moreover, the implementation illustrated in FIG. 3 further comprises a displacement sensor 60 adapted to determine a value of an actual displacement of the variable displacement hydraulic machine 26. The value of the actual displacement may be used in a feedback loop control for controlling the displacement control device 58.

The displacement of the variable displacement hydraulic machine 26 and the pressure of the fluid fed to the variable displacement hydraulic machine 26 will result in a torque produced by the variable displacement hydraulic machine 26. As such, by controlling the displacement control device 58 to thereby control the displacement of the variable displacement hydraulic machine 26, the torque produced by the variable displacement hydraulic machine 26 is controlled.

Further, as indicated in the FIG. 3 implementation, the variable displacement hydraulic machine control unit 56 may be adapted to receive a signal 62 from another control unit (not shown). Purely by way of example, the signal 62 may comprise information indicative of a desired speed and/or an actual speed of the working machine 10. As another non-limiting example, the signal 62 may comprise information indicative of a pressure of the fluid fed to the variable displacement hydraulic machine 26.

As such, though purely by way of example, if the signal 62 comprises information indicative of a desired speed of the working machine 10, the variable displacement hydraulic machine control unit 56 may control the displacement control device 58 such that the rotational speed of the variable displacement hydraulic machine 26 corresponds to the speed thus desired. For instance, a requisite speed of the variable displacement hydraulic machine 26 may be determined by determining a requisite speed of the ground contacting portion, e.g. the circumference, of the ground engagement element 12 in order to obtain the desired speed of the working machine 10 and from the requisite speed thus determined determining a requisite rotational speed of the variable displacement hydraulic machine 26, for instance taking the radius of the ground engagement element 12 and possibly a gear ratio between the variable displacement hydraulic machine 26 and the ground engagement element 12 into account.

Instead of, or in addition to, controlling the displacement control device 58 such that the rotational speed of the variable displacement hydraulic machine 26 results in a desired speed of the working machine 10, the displacement control device 58 may be adapted to control the displacement control device 58 in order to avoid slip of the ground engagement element 12. As such, though purely by way of example, if the signal 62 comprises information indicative of an actual speed of the working machine 10, it is possible to determine whether or not the absolute value of the difference between the speed of the ground contacting portion of the ground engagement element 12 and the speed of the working machine is within a predetermined range.

If the absolute value of the above difference is outside the above range, this is an indication that the ground contacting portion of the ground engagement element 12 slides on the ground. In such an event, the displacement control device 58 is preferably controlled in order to mitigate such a sliding condition.

For instance, if the speed of the ground contacting portion of the ground engagement element 12 is lower than the speed of the working machine, this is an indication that the ground contacting portion is dragged on the ground and this may be avoided by increasing the speed of the ground contacting portion, by increasing the torque imparted thereon, by increasing the rotational speed of the variable displacement hydraulic machine 26 which in turn may be achieved by increasing the displacement thereof by actuating the displacement control device 58.

As another example, if the speed of the ground contacting portion of the ground engagement element 12 is greater than the speed of the working machine, this is an indication of a slip of the ground engagement element 12 which may be avoided by reducing the speed of the ground contacting portion, by reducing the torque imparted thereon, by decreasing the rotational speed of the variable displacement hydraulic machine 26 which in turn may be achieved by decreasing the displacement thereof by actuating the displacement control device 58.

Figure 4:
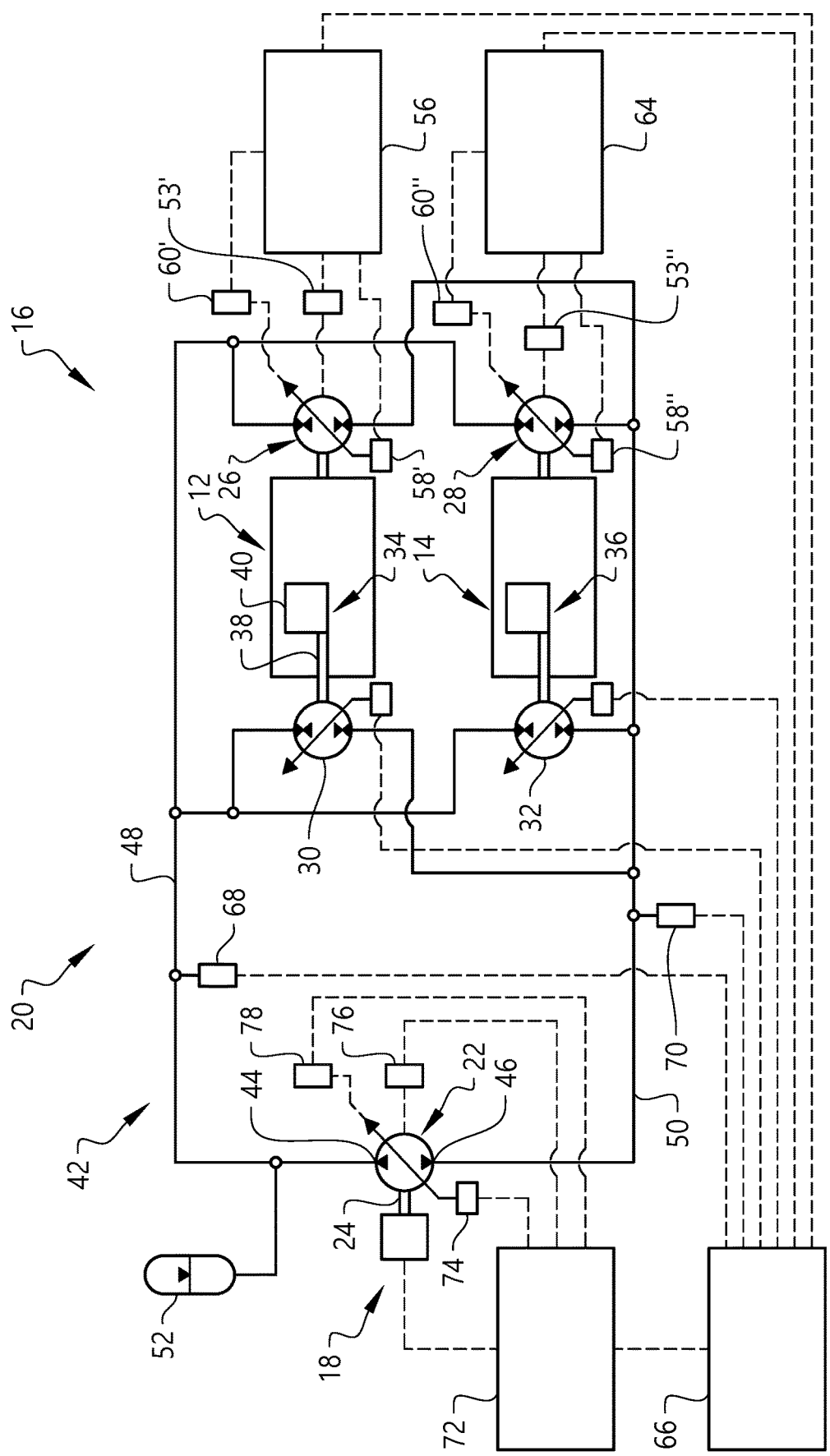
FIG. 4 illustrates another embodiment of a powertrain and a hydraulic system.

FIG. 4 illustrates an embodiment in which each one of the variable displacement hydraulic machines 26, 28 adapted to drive a ground engagement element 12, 14 is connected to a variable displacement hydraulic machine control unit 56, 64, a displacement control device 58', 58", a speed sensor 53', 53" and a displacement sensor 60', 60" in the manner that has been discussed hereinabove in relation to FIG. 3. Moreover, as indicated in the FIG. 4 embodiment, the hydraulic system 20 may comprise a master control unit 66 adapted to issue a signal to each displacement control device 58', 58" in the set of displacement control devices.

In the embodiment illustrated in FIG. 4, the master control unit 66 is adapted to issue a signal to each displacement control device 58', 58" in the set of displacement control devices via the respective variable displacement hydraulic machine control units 56, 64. However, it is also envisaged that, in embodiments of the hydraulic system 20, the master control unit 66 may issue a signal directly to each respective displacement control devices, alternatively via another control unit (not shown).

Further, in the embodiment illustrated in FIG. 4, the master control unit 66 may be adapted to issue signals to control the displacement of each one of the variable displacement hydraulic machines 30, 32 being adapted to drive a vibrator 34, 36.

Moreover, as indicated in FIG. 4, the hydraulic system 20 may comprise a first pressure sensor 68 adapted to issue a high pressure signal indicative of the fluid pressure in the high pressure line 48. For instance, the high pressure signal may be transmitted to the master control unit 66.

Additionally, the hydraulic system 20 may comprise a second pressure sensor 70 adapted to issue a low pressure signal indicative of the fluid pressure in the low pressure line 50. For instance, the low pressure signal may be transmitted to the master control unit 66.

Moreover, as indicated in each one of the FIG. 2 and FIG. 4 embodiments, the feeding pump 22 may have a variable displacement. For example, and as indicated in FIG. 4, the hydraulic system 20 may comprise a second control unit 72 adapted to issue a control signal to a feeding pump displacement control device 74 controlling the displacement of the feeding pump 22. Here, it should be noted that the hydraulic system 20 may also comprise a feeding pump speed sensor 76 adapted to determine a value indicative of a rotational speed of the feeding pump 22. Further, the hydraulic system 20 may comprise a feeding pump displacement sensor 78 adapted to determine a value of an actual displacement of the feeding pump. It is also envisaged that embodiments of the hydraulic system 20 may comprise a single control unit adapted to perform the operations performable by the master control unit 66 and the second control unit 72 as described hereinabove.

The second control unit 72, the feeding pump displacement control device 74, the feeding pump speed sensor 76 and the feeding pump displacement sensor 78 may be adapted to interact in the same way as the corresponding components interact in FIG. 3 and as described hereinabove.

Moreover, as indicated in FIG. 4, the second control unit 72 may also be adapted to issue a control signal to the power source 18. As a non-limiting example, the feeding pump 22 and possibly also the power source 18 may be operated so as to produce a pressure and flow in the high pressure line 48 sufficient to supply requisite hydraulic power to each one of the variable displacement hydraulic machines 26, 28, 30, 32 being connected in parallel to the feeding pump 22. Moreover, again as a non-limiting example, the feeding pump 22, and possibly also the power source 18, may be controlled such that a fluid pressure in the high pressure line 48 does not excessively exceed a pressure required for the variable displacement hydraulic machines 26, 28, 30, 32. As a non-limiting example, the feeding pump 22, and possibly also the power source 18, may be controlled such that a fluid pressure in the high pressure line 48 at maximum exceeds a determined required pressure by a predetermined pressure tolerance. Purely by way of example, such a pressure tolerance may be a predetermined percentage, such as 10% or 5%, of the determined needed pressure.

As such, though purely by way of example, the torque currently required by each one of the variable displacement hydraulic machines 26, 28, 30, 32 may be determined, and from the torque values thus determined a pressure required in the high pressure line 48 may be determined. The feeding pump 22, and possibly also the power source 18, may thereafter be operated such as to produce a pressure the magnitude of which is the required pressure plus a pressure tolerance.

It should be noted that although the embodiments presented hereinabove discloses variable displacement hydraulic machines which are adapted to either drive a ground engaging member or a vibrator, it is also envisaged that embodiments of the hydraulic system 20 may comprise a plurality of variable displacement hydraulic machines being connected in parallel to the feeding pump 22, wherein at least one variable displacement hydraulic machine is adapted to drive another component of the working machine 10. Non-limiting examples of such components include a fan (not shown) driven by a variable displacement hydraulic machine, a steering assembly (not shown) driven by a variable displacement hydraulic machine and any other type of hydraulically powered actuator, such as an actuator adapted to move an implement (not shown) of a working machine.

As such, it is to be understood that the present invention is not limited to the embodiments described above and illustrated in the drawings; rather, the skilled person will recognize that many changes and modifications may be made within the scope of the appended claims.

The invention claimed is:

1. A hydraulic system for a working machine, said hydraulic system comprising:
   a feeding pump;
   a plurality of variable displacement hydraulic machines being connected in parallel to said feeding pump;
   a first one of said variable displacement hydraulic machines being adapted to drive a ground engagement element of said working machine, and a second one of said variable displacement hydraulic machines being adapted to drive a vibrator for vibrating the ground engagement element of said working machine;
   a speed sensor adapted to determine a value indicative of a rotational speed of the first one of the variable displacement hydraulic machines;
   a displacement sensor adapted to determine a value of an actual displacement of the first one of said variable displacement hydraulic machines; and
   a control unit configured to operate the first one of the variable displacement hydraulic machines in response to outputs of the speed sensor and the displacement sensor to drive the ground engagement element in order to obtain a desired driving condition.

2. The hydraulic system according to claim 1, wherein said plurality of variable displacement hydraulic machines is connected to said feeding pump in parallel through a circuit conduit assembly; and
   wherein said circuit conduit assembly comprises a high pressure line and a low pressure line, wherein said feeding pump comprises a high pressure side and a low pressure side, wherein said high pressure line fluidly connects each one of said plurality of variable displacement hydraulic machines to said high pressure side, wherein said low pressure line fluidly connects each one of said plurality of variable displacement hydraulic machines to said low pressure side, wherein said hydraulic system comprises a first pressure sensor and a second pressure sensor,
   wherein said first pressure sensor is adapted to issue a high pressure signal indicative of fluid pressure in said high pressure line, wherein said second pressure sensor is adapted to issue a low pressure signal indicative of the fluid pressure in said low pressure line.

3. The hydraulic system according to claim 2, wherein said circuit conduit assembly comprises an accumulator.

4. The hydraulic system according to claim 1, wherein the first one of said variable displacement hydraulic machines is adapted to operate both as a hydraulic pump and as a hydraulic motor.

5. The hydraulic system according to claim 1, wherein said hydraulic system comprises a set of displacement control devices, each displacement control device being adapted to control the displacement of one of said variable displacement hydraulic machines.

6. The hydraulic system according to claim 5, wherein the control unit is adapted to issue a signal to each displacement control device in said set of displacement control devices.

7. The hydraulic system according to claim 1, wherein the ground engagement element is a compactor drum.

8. The hydraulic system according to claim 1, wherein said feeding pump has a variable displacement.

9. A powertrain comprising a power source and a hydraulic system according to claim 1, said power source being operably connected to said feeding pump of said hydraulic system.

10. A working machine comprising a powertrain according to claim 9 and/or a hydraulic system according to claim 1.

11. The working machine according to claim 10 comprising a set of ground engagement elements, wherein said set of ground engagement elements comprises at least one of a wheel and a compactor drum.

12. A method for operating a working machine comprising a powertrain which in turn comprises a power source and a hydraulic system, said hydraulic system comprising:
 a feeding pump operably connected to said power source;
 a plurality of variable displacement hydraulic machines being connected in parallel to said feeding pump;
 at least a first one of said variable displacement hydraulic machines being adapted to drive a ground engagement element of said working machine, and
 at least a second one of said variable displacement hydraulic machines being adapted to drive a vibrator for vibrating a ground engagement element of said working machine,
 wherein said hydraulic system comprises a speed sensor adapted to determine a value indicative of a rotational speed of the first one of said variable displacement hydraulic machines and a displacement sensor adapted to determine a value of an actual displacement of the first one of said variable displacement hydraulic machines,
 said method comprising:
 determining a desired driving condition of said working machine,
 receiving inputs from said speed sensor and said displacement sensor, and
 operating at least said power source and each one of said variable displacement hydraulic machines being adapted to drive a ground engagement element in response to said inputs from said speed sensor and said displacement sensor in order to obtain said desired driving condition.

13. The method according to claim 12, wherein said plurality of variable displacement hydraulic machines is connected to said feeding pump in parallel through a circuit conduit assembly, and wherein said circuit conduit assembly comprises an accumulator, said method further comprising:
 upon determination that said desired driving condition of said working machine is braking said working machine, controlling at least one of said variable displacement hydraulic machines that is adapted to drive a ground engagement element of said working machine so as to operate as a hydraulic pump for feeding fluid to said accumulator.

14. A control unit for operating a working machine comprising a powertrain which in turn comprises a power source and a hydraulic system, said hydraulic system comprising:
 a feeding pump operably connected to said power source;
 a plurality of variable displacement hydraulic machines being connected in parallel to said feeding pump;
 at least a first one of said variable displacement hydraulic machines being adapted to drive a ground engagement element of said working machine, and
 at least a second one of said variable displacement hydraulic machines being adapted to drive a vibrator for vibrating a ground engagement element of said working machine,
 wherein said hydraulic system comprises a speed sensor adapted to determine a value indicative of a rotational speed of the first one of said variable displacement hydraulic machines and a displacement sensor adapted to determine a value of an actual displacement of the first one of said variable displacement hydraulic machines,
 said control unit being adapted to:
 receive information indicative of a desired driving condition of said working machine,
 receiving inputs from said speed, sensor and said displacement sensor, and
 issue a signal to at least said power source and to each one of said variable displacement hydraulic machines being adapted to drive a ground engagement element in response to said inputs from said speed sensor and said displacement sensor so that they are operated in order to obtain said desired driving condition.

* * * * *